(12) United States Patent
Nakamura et al.

(10) Patent No.: US 6,339,203 B1
(45) Date of Patent: Jan. 15, 2002

(54) SPINDLE SYSTEM FOR DIESINK TYPE ELECTRIC DISCHARGE MACHINE

(75) Inventors: Takahiro Nakamura; Kenji Yamada, both of Fukui (JP)

(73) Assignee: Sodick Co., Ltd., Yokohama (JP)

( * ) Notice: Subject to any disclaimer, the term of this patent is extended or adjusted under 35 U.S.C. 154(b) by 0 days.

(21) Appl. No.: 09/582,452

(22) PCT Filed: Oct. 4, 1999

(86) PCT No.: PCT/JP99/05486
 § 371 Date: Jun. 26, 2000
 § 102(e) Date: Jun. 26, 2000

(87) PCT Pub. No.: WO00/24541
 PCT Pub. Date: May 4, 2000

(30) Foreign Application Priority Data
 Oct. 27, 1998 (JP) .............................. 10-305089

(51) Int. Cl.[7] .............................. B23H 1/00; B23H 7/18; B23H 7/20; G05B 19/25
(52) U.S. Cl. .................... 219/69.2; 219/69.16; 318/571; 318/572
(58) Field of Search .............................. 219/69.16, 69.2; 318/571, 572, 573, 609, 610

(56) References Cited

U.S. PATENT DOCUMENTS 3,657,524 A * 4/1972 Bakke
4,150,275 A * 4/1979 Waure ..................... 219/69.16
4,642,542 A * 2/1987 McKeand .................. 318/571
5,248,921 A * 9/1993 Kato et al. ................. 318/610
5,589,086 A * 12/1996 Sawada et al. .......... 219/69.16

FOREIGN PATENT DOCUMENTS

| JP | 6-134624 | 5/1994 |
| JP | 6-226545 | 8/1994 |
| JP | 10-283007 | 10/1998 |

* cited by examiner

*Primary Examiner*—Geoffrey S. Evans
(74) *Attorney, Agent, or Firm*—McDermott, Will & Emery; Paul Devinsky

(57) ABSTRACT

The main spindle (1A) for the main spindle device of a diesinker electric discharge machine is connected to a high rotor inertia, high output servo motor (15) without passing through a speed reducer; the servo motor (15) is equipped with a high resolution encoder (14). A main spindle rotation speed detection signal is detected by the encoder (14) when the main spindle (1A) is rotating in the high speed mode, and a main spindle angle position and rotation speed detection signal are detected when the main spindle (1A) is being angle divided, and these signals are fed back to the servo motor (15) motor driver (16). High speed rotational control and angle position precision angle division control are accomplished by a single servo motor and a single encoder.

4 Claims, 5 Drawing Sheets

SPINDLE SYSTEM FOR DIESINK TYPE ELECTRIC DISCHARGE MACHINE

FIELD OF THE INVENTION

The present invention relates to a main spindle device for a diesink type electric discharge machine which machines a hole shape into a workpiece by positioning an attached tool opposite a workpiece by a certain distance and applying a specific electric discharge voltage between the workpiece and the electrode. More particularly, the present invention relates to a main spindle device in which the main spindle may be controlled both by high speed rotation control and by high precision angle division control.

BACKGROUND OF THE INVENTION

In general, main spindle devices for electric discharge machines are mounted on a machining head, the in and out motion of which is controlled in the plumb (vertical) direction by a servo motor on a column mounted on a bed, with the tool electrode advancing in the depth direction of the hole being machined in the workpiece. The tool electrode is attached at the main spindle device main spindle lower end, and the workpiece is placed on a surface plate on top of a table mounted on the head. A machining vessel placed around the surface plate is filled with a machining fluid which serves as an electric discharge machining medium, and machining of the workpiece is carried out therein in a submerged state.

It is advantageous when machining holes of various shapes using a main spindle device of this type to be able to move the tool electrode not only in and out in the advancing direction, but also to be able to turn the electrode or the workpiece in the high speed mode around the main spindle, or to angle divide in the rotational direction around the center axis of the main spindle. This makes it possible to perform electric discharge machining of machined holes having complex profiles by moving a round rod or other simple shaped tool electrode while rotating it with respect to the workpiece, or to attain a desired angle with respect to the workpiece using a tool electrode formed in a desired shape, such that machining can be performed at a desired angle of inclination. It is also possible, by combining main spindle angle division and perpendicular in and out motion, to machine complex machining holes such as screw holes.

Spindle devices in which such rotation control and angle division control are possible have been utilized for some time, and have been described in the patent literature. We shall now explain an example of a conventional main spindle device representative of such devices. In the explanation below, the motion control axis of the main spindle in the machining depth direction is referred to as the Z axis, the motion control axis in one axis direction on a plane perpendicular to the Z axis is referred to as the X axis, and the motion control axis in another axis direction perpendicular to the X axis on the aforementioned plane is referred to as the Y axis. Further, a rotation at approximately 1,000 rpm, and preferably at approximately 3,000 rpm is referred to as high speed rotation, and the axis rotational direction control is referred to as R axis control. Rotating the main spindle around the main spindle center to precisely position it at a desired angular position is referred to as angle division, and control of the rotational direction thereof in the control is referred to as C axis control. Rotation in that case is of course at a slow speed.

An example of a main spindle device in which the above-described operations are possible is depicted in FIG. 4. In FIG. 4 there is a main spindle device main unit 1; a main spindle 1A; a machining head 2; a servo motor 41; a rotary encoder 42; and a transfer mechanism 43 which transfers rotation of servo motor 41 to the main spindle. Explanation of the mechanism which moves the machining head 2 in and out, i.e. up and down, in the Z axis direction is omitted.

A rotary encoder 44 is attached to the servo motor 41 and the rotational speed of the servo motor 41 is detected. The rotary encoder 44 detects the rotation of a servo motor, and therefore a rotary encoder resolution of approximately 4,000 divisions (number of increments per degree) is sufficient. The rotary encoder 42 for angle division is attached to the main spindle 1A on machining head 2, and the angular position of the main spindle 1A is detected. The rotary encoder 42 is also variously referred to as the rotary scale and differs from devices normally placed on motors; a device having an extremely high resolution of, for example, 360,000 divisions is used. The reason such extremely high resolution rotary encoders or rotary scales are used is to respond to the particular workpiece requirements of high angle division precision. In particular, in electric discharge machining such as the screw hole machining described above, servo control may performed in which the tool electrode is controlled simultaneously in the Z axis and C axis directions while maintaining a fixed gap between the tool electrode and the workpiece, such that a much higher precision of angle division is required.

The transfer mechanism 43 comprises a coupling 43A affixed to the servo motor 41 output axis end, a pulley 43B affixed through the coupling 43A to the servo motor 41 axial end, a timing belt 43D running between the pulleys 43B and 43C, and a worm wheel 43F affixed to a machining head 2. Rotation of the servo motor 41 is transferred to the worm 43E, which causes the worm wheel 43F to rotate; the main spindle 1A is decelerated and rotates by means of the worm wheel 43F. As will be described below, that deceleration ratio is determined in accordance with the resolutions of the rotary encoders 42 and 44. Therefore in the case, as above, of a rotary encoder 42 having 360,000 divisions and a rotary encoder 44 having 4,000 divisions, a 1/90 device is selected.

When the main spindle 1A is rotated in the high speed mode in such a conventional device, a feedback signal from the rotary encoder 44 is used to control the servo motor 41 such that the main spindle rotates at a desired speed. In this situation, no feedback signal from the rotary encoder 42 is used.

Meanwhile, when angle dividing the main spindle 1A, the motor driver is switched in order to validate the feedback signal from the rotary encoder 42, which is used to control the angular position of the servo motor 41, while at the same time the feedback signal from the rotary encoder 44 is used to control the angular position of the servo motor. The reason for using two encoders in this manner is to permit a speed reducer to be interposed between the main spindle 1A and the servo motor 41. Due to the small amount of looseness, backlash, clutch slippage, etc. inherent in the speed reducer, control of the servo motor 41 does not immediately match that of the main spindle 1A, and therefore without feedback control is not stable from the respective rotary encoders for the servo motor 41 and the main spindle.

Feedback control using the two rotary encoders thus requires that the rotary encoder 44 resolution and the rotary encoder 42 resolution be matched. In this conventional example, a speed reduction ratio of 1/90 is selected, so the resolution of the 4,000 division rotary encoder 44 has a converted resolution of 4,000×90=360,000 at the main spindle 1A.

Another example of a main spindle device in which the above-described operations are possible is depicted in FIG. 5. Parts which are the same or similar as parts in the example described in FIG. 4 are given the same reference numerals. This example uses the same technical concept as the main spindle device disclosed in Laid Open Patent JP-H6-134624. In FIG. 5, there is depicted a main spindle device main unit 1; a main spindle 1A; a spindle 18 which is an integral piece with the main spindle 1A; a servo motor 51 for angle division; a rotary scale 52 attached around the spindle 18; and a brake device 54 which holds the main spindle 1A at an angle position after angle division has been performed. As in the previous embodiment, a high resolution of approximately 360,000 divisions is used for the rotary scale 53, and 4,000 divisions is used for the rotary encoder 52. A high rotation speed AC motor 55 is coupled to a speed reducer 56, which reduces speed at a specific speed reduction ratio based on the difference in number of teeth on inner and outer gears (not shown). The speed reduction ratio is 1/90, as in the previous embodiment. A clutch 57 separates the upper side of the speed reducer 56 from the spindle 1A. A jet flow unit 58 supplies a jet of machining fluid to the tool electrode.

When the main spindle 1A is rotating in the high speed mode, the servo motor 51 is separated from the spindle 1A by the clutch 57. At the same time the AC motor 55 is controlled such that the main spindle rotates at a desired speed. Excessively fast rotation and burning loss of the servo motor 51 are thus prevented. At the same time, when angle division on main spindle 1A is performed, the AC motor 55 is placed in an uncontrolled state, while the servo motor 51 is connected and controlled by the clutch 57. The motor driver for the servo motor 51 (not shown) is controlled; this motor driver controls the angular positioning of the servo motor 51 by means of the rotary scale 53 feedback signal, and controls the angular positioning of the servo motor 51 by means of the rotary encoder 52 feedback signal. Thus the main spindle 1A is positioned at a desired angular position. This example is similar to the previous conventional example for those points which are under feedback control by the two rotary encoders.

However, problems with connections arise in the structure of the above-described conventional examples. In the first conventional example, it is possible to switch the main spindle device between high speed rotation and angle division by means of a single motor. However, when the speed reduction ratio is increased in order to achieve a higher angle division precision, a problem arises in that the main spindle cannot turn in the high speed mode using a high speed reduction ratio. In other words, in this conventional example, the main spindle device requires that one or the other of the high speed rotation or high precision angle division functions be emphasized. In the second conventional example, the high speed rotation control and the angle division control can both be fully performed by switching between the two motors. However, the main spindle device requires 2 motors and 2 motor drives, as well as a speed reducer and other parts such as a clutch. The main spindle device is complex, having a large number of parts, in addition to being complex from a control standpoint.

Also, a speed reducer is used in both of the conventional examples, such that angle position control must be performed using a rotary encoder on the servo motor side, in addition to the requirement for a high resolution rotary encoder when performing high precision angular division.

An objective of the present invention, therefore, is to provide a main spindle device in which either high speed rotation control or high precision angle division control may be selected using a single motor and a single encoder without the need for a speed reducer and which is, as a result, of a simpler and more compact structure.

SUMMARY OF THE INVENTION

A main spindle device according to the present invention, which is one preferable embodiment for the purpose of achieving the and other objectives, may comprise the following elements; a machining head mounted so as to be able to travel in and out of a workpiece in a machining depth direction; a high output servo motor having a high rotor inertia in order to rotate the main spindle without decelerating; a high resolution angle position detector to detect the rotation speed and angular position of the servo motor for the main spindle; a numerical controller which outputs a switching signal to switch between high speed rotation of the above main spindle and angle division of the main spindle, while outputting a speed command signal in response to a desired rotational speed when turning the main spindle in the high speed mode, and outputting a desired angle position command signal when angle dividing the main spindle; and a motor driver which performs closed loop control of the high rotational speed of the main spindle using the speed command signal and a feedback signal from the angle position detector, while also performing closed loop control of the main spindle angle position using at least the angle position command signal and the feedback signal from the angle position detector when angle dividing the main spindle.

In the main spindle device of this embodiment, the main spindle high precision angle division and high speed rotation are controlled by a single motor, a single motor driver, and a single encoder. The result is a simple structure in which the main spindle device does not require a speed reducer.

In another preferred embodiment, a main spindle device machine according to the present invention comprises a main spindle placed on a machining head mounted so as to be movable in and out of a workpiece in a machining depth direction; a high rotor inertia, high output servo motor which rotates the main spindle without decelerating; a high resolution angle position detector mounted either on the servo motor or on the main spindle, which detects the rotational speed and angle position of the servo motor or the main spindle; a numerical controller which outputs a switching signal to switch between high speed rotation of the main spindle and angle division of the main spindle, while at the same time outputting a speed command signal in accordance with a desired rotational speed, and an angle position command signal for setting the desired angle when angle dividing the main spindle; and a motor driver which, when rotating the main spindle in the high speed mode, performs speed control through closed loop control of the servo motor by means of the speed command signal and a feedback signal, which is a signal from the angle position detector, the pulse count of which is reduced by a specified proportion. When angle dividing the main spindle, closed loop control of the main spindle angular position is performed by means of at least the angular position command signal and the feedback signal from the angular position detector.

In the main spindle device of this embodiment, high precision angle division and high speed rotation of the main spindle are controlled with a single motor, a single motor driver, and a single encoder, and a simple structure suffices wherein the main spindle device does not require a speed reducer. Also, the feedback signal pulse count is reduced, and the load on the motor driver is therefore reduced, as is the occurrence of errors.

In yet another preferred embodiment, the motor driver of the above-described main spindle device comprises a deviation output means which, when angle dividing the main spindle, feeds back a signal from the angle position detector to the angle position command signal and outputs the deviation thereof, and, when rotating the main spindle in the high speed mode, does not feed back the signal from the angle position detector to the rotation speed command signal; and a subtraction circuit which, when angle dividing of the main spindle, feeds back a signal from the angle position detector to the output of the position gain control element and outputs the deviation thereof, and, when rotating the main spindle in the high speed mode, feeds back the signal from the angle detector to the rotational speed command signal and outputs the deviation thereof; and a speed gain control element which, when angle dividing the main spindle or when rotating in the high speed mode, controls the outputs from the subtraction circuit at the respective desired speed gains and supplies an output.

According to this embodiment, when performing high speed control of the main spindle, a single servo motor controls the rotational speed by means of a feedback signal from a single angle position detector, while at the same time, when controlling the main spindle by high precision angle division, angular position is controlled by a single servo motor using the feedback signal from a single angle position detector.

PREFERRED EMBODIMENT OF THE INVENTION

Figure 1:
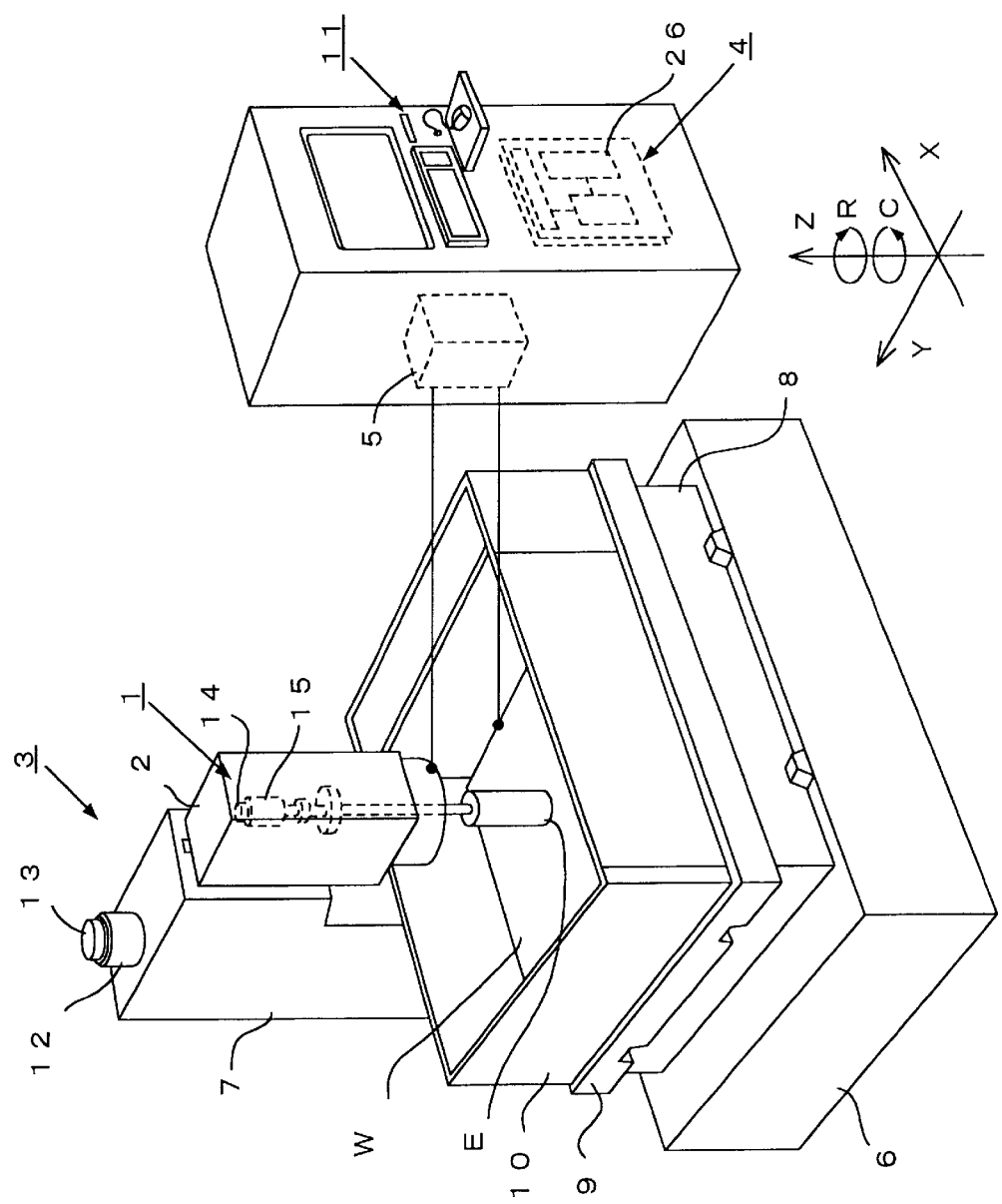
FIG. 1 is a structural diagram depicting the outline of the overall electric discharge machine main spindle device of the present invention.

An outline of the overall structure of an exemplary embodiment of an electric discharge machine main spindle device of the present invention is shown in FIG. 1. Below, the same parts or equivalent parts to those explained above for the conventional technology will be explained using the same reference numerals. The machine includes a machining head 2; a shaping electric discharge machine main unit 3; a numerical controller 4 used with the shaping electric discharge machine main unit; a machining power supply 5; a horizontally arranged bed 6; a column 7 vertically positioned on the bed; a saddle 8 mounted so as to be movable in the Y axis direction on the bed; a table 9 mounted on the saddle so as to be movable in the X axis direction; and a machining vessel 10 attached to the table. An input device 11 inputs data to the numerical controller 4, and may comprise a keyboard, mouse, and/or magnetic disk drive. The X axis and Y axis drive devices which drive the saddle 8 and the table 9 are the same as in the conventional technology, and are therefore not diagrammed. A servo motor 12 moves the machining head 2 in and out in the Z axis direction; the speed of movement and position in the Z axis direction are controlled by a feedback signal from a rotary encoder 13 attached to the servo motor 12.

Figure 5:
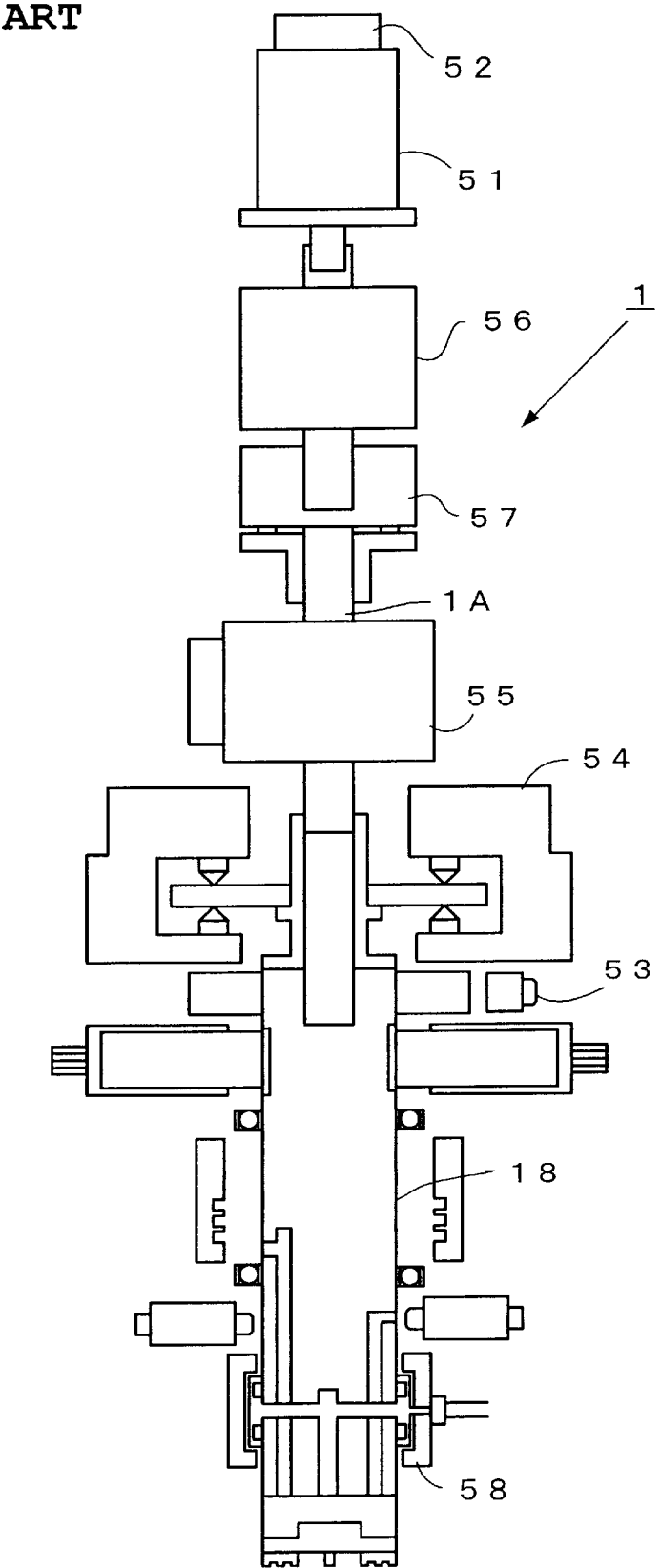
FIG. 5 is a sectional diagram depicting an example of another conventional electric discharge machine main spindle device.

The main spindle device main unit 1 is provided within the machining head 2. As is later detailed in connection to FIG. 2, the main spindle device main unit 1 is equipped with a single servo motor 15, to which a rotary encoder 14 is attached as an angle position detection device. The rotary encoder 14 is a high resolution encoder, having at least approximately 360,000 divisions. Therefore, when it is not attached to the servo motor 15, it may be used as a rotary scale 53, integrally affixed to a spindle 18 as shown in FIG. 5. The rotary encoder 14 feedback signal is input to the motor driver 16, as explained below in FIG. 3.

Rotational drive control for main spindle device main unit 1 is direct by means of the servo motor 15, without mediation by a speed reducer. A high output servo motor is therefore preferred for the servo motor 15. That is because the load inertia on the servo motor 15 when there is no speed reducer is much larger than the load inertia when there is a speed reducer. Conventionally, when a speed reducer is used, the load inertia placed on the motor shaft is reduced by the speed reduction ratio of the speed reducer. Assuming a load inertia of $GDa^2$ and a speed reduction ratio of r1/r2, the motor shaft converted load inertia $GDm^2$ becomes $(r1/r2)^2 \times GDa^2$. Therefore elimination of a speed reducer having, for example, a reduction ratio of 1/2 prevents a reduction in the load inertia placed on the servo motor 15 by 1/4, so the result is a quadrupling. Also, the load inertia which is controllable by the servo motor is limited as a ratio of the rotor inertia of the servo motor itself to the load inertia, and the servo motor 15 is therefore preferably selected to be a motor having a relatively large rotor, so that the proportion of load inertia to rotor inertia is not high. Preferably a servo motor having a high output as well as a relatively large rotor inertia is used as the servo motor 15 of the present invention.

Figure 2:
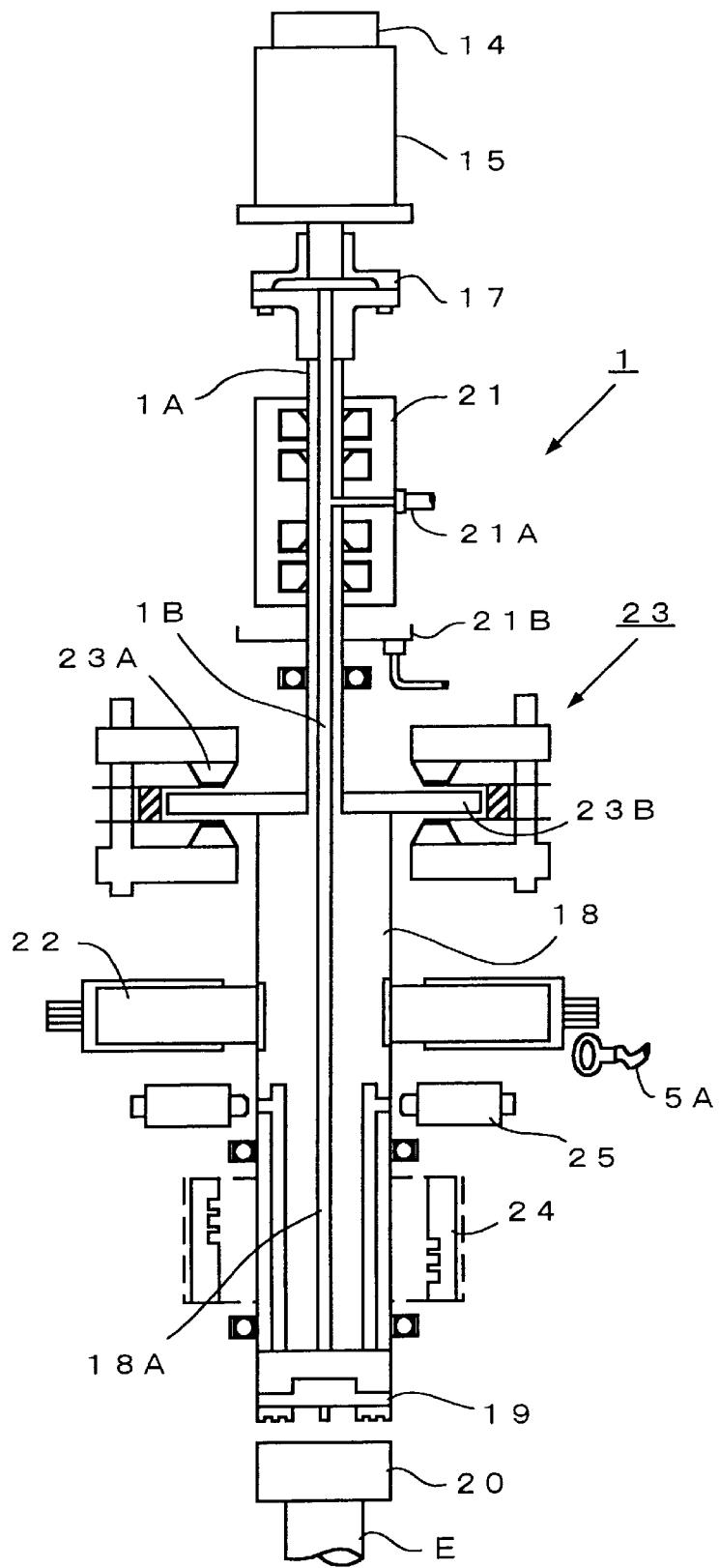
FIG. 2 is a sectional diagram depicting the main portions of the electric discharge machine main spindle device of the present invention.

The structure of the main portions of the shaping electric discharge machine main spindle device main unit of the present invention are shown in FIG. 2. The main spindle 1A is directly connected at its top end through a coupling to the rotating axis of the servo motor 15. A spindle 18 is attached to the bottom end of the main spindle 1A, and a holder 20, which holds the tool electrode E, is fit onto a fitting portion 19 at the bottom of the spindle 18. The main spindle 1A and the spindle 18 are separately described, but it is common for the main spindle and the spindle to be used as an integral piece, and the main spindle 1A and the spindle 18 may be viewed as single piece.

In electric discharge machining, stable machining is achieved by interposing electric discharge machining fluid in the machining gap formed between the tool electrode E and the workpiece W. A jet flow unit 21 is therefore provided, and machining fluid (supplied from a machining fluid supply device not shown) is introduced from a jet flow injection hole 21A, passes through a main spindle center hole 1B and a machining fluid flow path 18A provided on the spindle 18, and is supplied to the tool electrode E. An oil pan 21B is attached around the machining head 2 on the bottom side of the jet flow unit 21, the oil pan 21B receives machining fluid leaked from the jet flow unit 21 and ejects the leaked machining fluid outside of the machining head 2.

In an electric discharge machine a current must be supplied from the machining power supply to the tool electrode E. A conducting brush 22 is therefore placed so as to rub against the spindle 18. A terminal on conducting wire 5A, which connects to one of the poles of the machining power supply 5, is screw-fastened thereto and passes machining current to the tool electrode E through conductive components of the spindle 18 (not depicted).

Furthermore, unlike conventional machining in which cutting tools such as drills or blades are held in place, in electric discharge machines, tool electrodes having a relatively large size and weight and of all shapes may be used. The motor's stopping force when turned off is therefore not by itself enough to stop the rotation, and the main spindle can frequently turn in the direction of rotation after angle division. A brake device 23 is therefore placed concentrically with the main spindle 1A around the main spindle 1A. In the illustrated embodiment a disk brake is shown (as an example), which is relatively simple in structure and strong in braking power. After angle division is carried out and positioning is completed, the disk 23B is pinched by the brake shoes 23A, and by holding the disk 23B still, the main spindle 1A is held still.

A main spindle cooling device 24 is a device to cool the temperature of the tool electrode E due to heat from the electric discharges using a cooling fluid such as the machining fluid, otherwise the electrode temperature would tend to rise, and of the heat generated by the rotation of the spindle 18 in the high speed mode. The cylinder 25 is for the removal and attachment of the holder 20.

Figure 3:
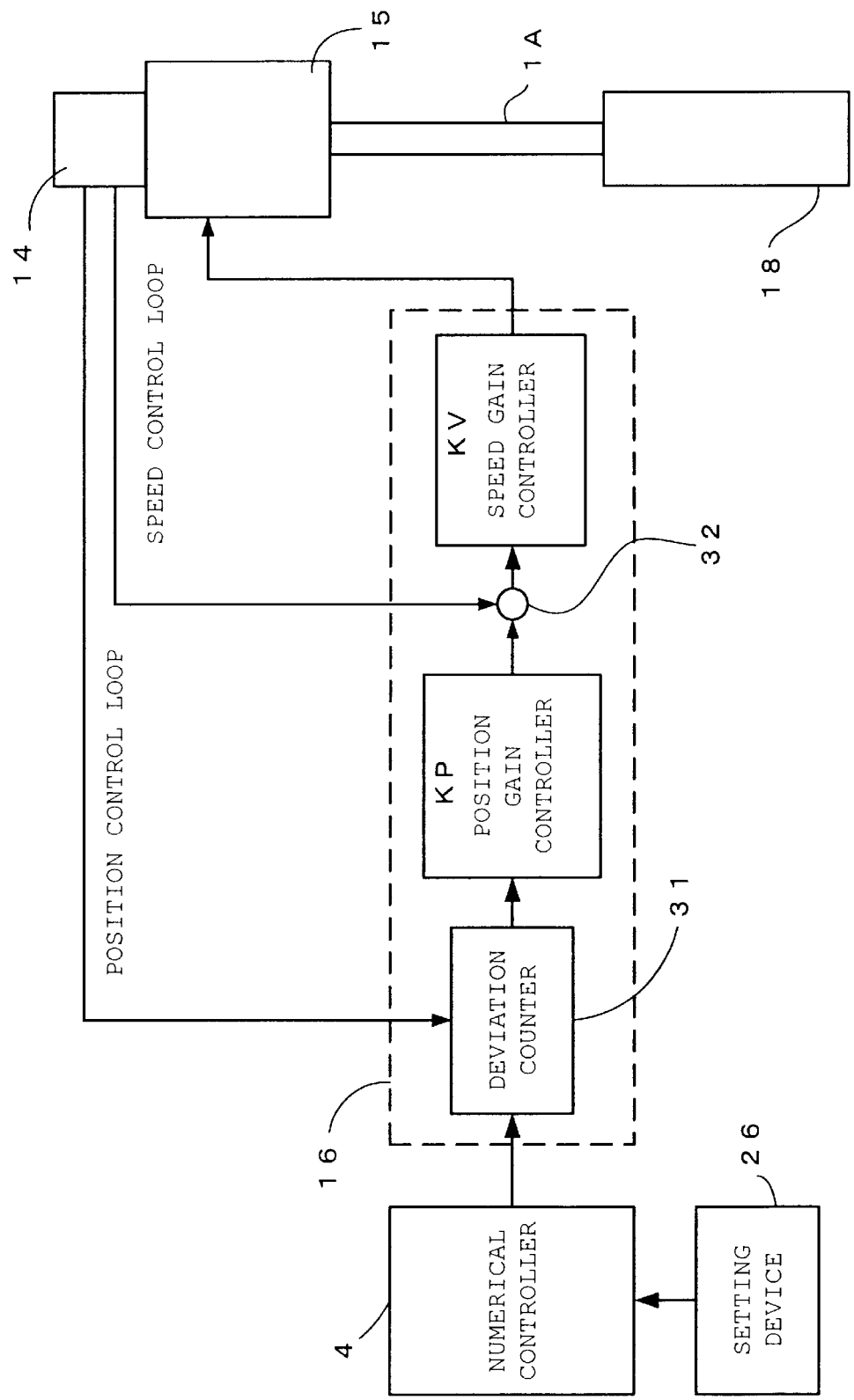
FIG. 3 is a block diagram depicting the motor driver of the electric discharge machine main spindle device of the present invention.
Figure 4:
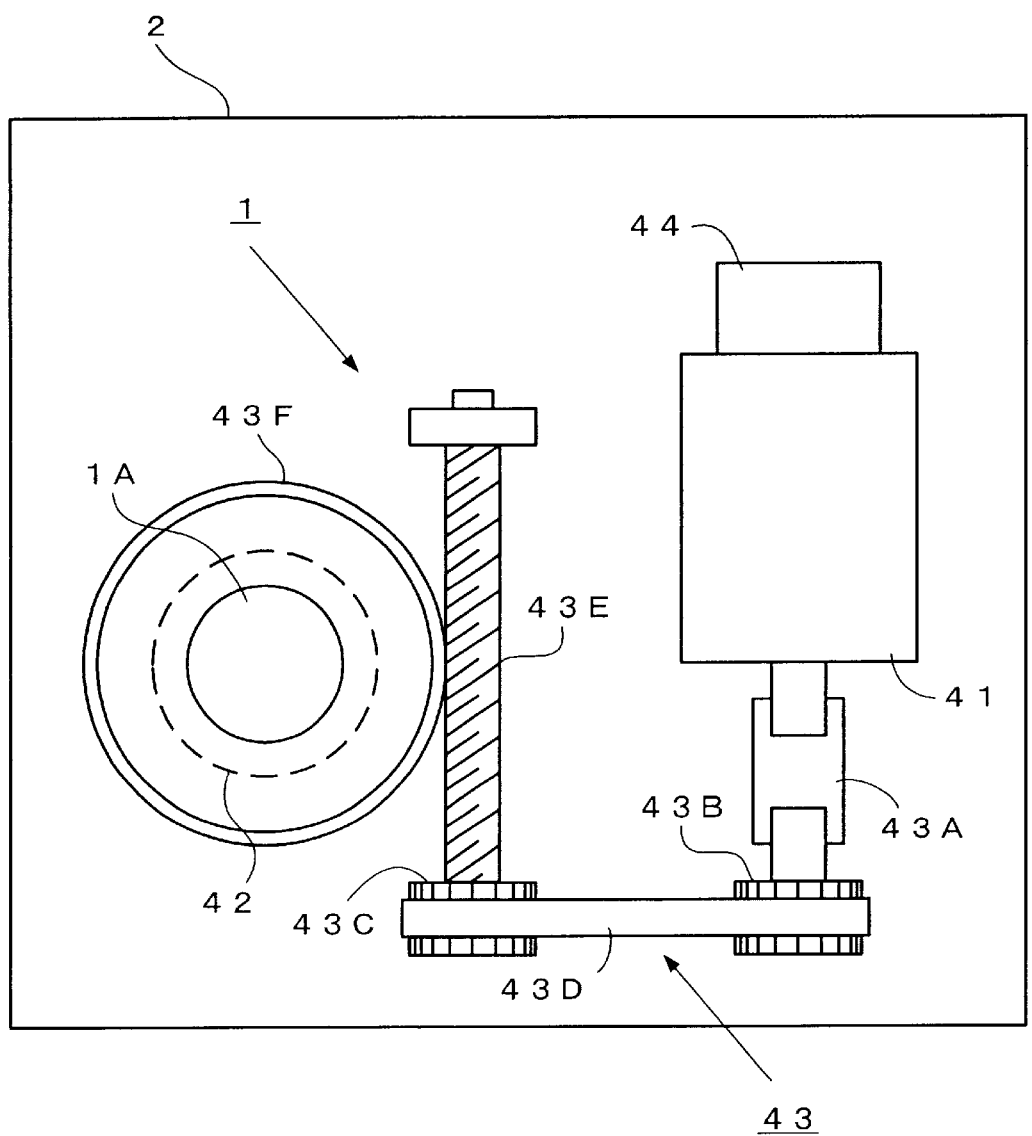
FIG. 4 is a sectional diagram depicting an example of a conventional electric discharge machine main spindle device.

FIG. 3 illustrates the control system of the motor driver 16 which controls the servo motor 15 of the present invention, and the control device thereof. The control system includes a numerical controller 4, a setting device 26, for example a RAM, which stores set values such as rotational speed and division angle position. In the numerical controller 4, a speed command signal is output at the same time as a start high speed rotation operation switch signal when the main spindle is under high speed rotation control. When angle division begins, only the angle position command signal is output. Of course the result is the same even if at the time that the angle division operation begins the switch signal indicating this is output, so for this embodiment the explanation below assumes that a high speed rotation start switch signal is output. NC program data or other NC data from an input device 11 is temporarily stored in the setting device 26.

The motor driver 16 comprises a deviation counter, which is a means for outputting deviation; a position gain control element KP; a subtraction circuit 32; and a speed gain control element KV.

The deviation counter 31 calculates the deviation between the output from the numerical controller 4 and the feedback signal from the rotary encoder 14. In the deviation counter 31, the feedback signal from the rotary encoder 14 is validated only when the motor driver 16 is performing angle division control of the main spindle. The deviation between the angle position command signal from the rotary encoder 14 and the feedback signal is generated in the deviation counter 31. When the motor driver 16 is performing high speed rotation control of the main spindle, the feedback signal from the rotary encoder 14 is ignored and no processing takes place. The deviation counter 31 is a logic circuit, and may therefore be varied using equivalent circuits. A system may be configured to judge the deviation between command signals using the high speed rotation signal and the angle division signal, so that no switching signal to perform high speed rotation is required.

Position gain KP and speed gain KV are preset in the numerical controller 4 in accordance with the inertia and control speed, etc. which can be expected given the operating conditions of the main spindle, the tool electrode, etc. In the present invention, as described above, there is no main spindle device speed reducer, so the loading inertia falls directly on the servo motor shaft. The servo motor is selected to be one with a large rotor inertia, or of a high output, and the position gain KP and speed gain KV are appropriately adjusted to relatively high values. Using this position gain KP and speed gain KV, the position deviation signal is amplified at the control element KP, and similarly the speed deviation signal is amplified at the control element KV. It is desirable in all cases to automatically switch and adjust the KV gain to low gain when the main spindle 1A is rotated in the high speed mode, and the KP and KV gain to high gain when the main spindle 1A is stopped to perform angle division. By so doing, vibration occurring at the switch-over from high speed rotation to angle division may be prevented.

The subtracting circuit 32, like the deviation counter 31, outputs a deviation between two input values, so it outputs the deviation between the output from the position gain control element KP and the speed feedback signal from the rotary encoder 14. During angle division of the main spindle, speed control is carried out in accordance with the next speed gain control element KV, as well as the angle position and speed deviations; minor loop control is performed in which speed is controlled such that the servo motor 15 does not exceed a specified speed. During high speed rotation control of the main spindle, a speed command signal is output from the numerical controller in place of outputting a position deviation from the position gain control element KP. A speed deviation is calculated using this speed command signal and the speed feedback signal, and speed control of the servo motor 15 is performed in accordance with the speed deviation using the next speed gain control element KV.

Referring now to FIGS. 1 through 3, the operational flow of the high speed rotational control and angle division control of the main spindle in the main spindle device of the present invention will be explained. NC data including the high speed rotation speed or angle division angle position is input from the input device 11 by means of an NC program stored on, for example, a magnetic disk, and temporarily stored on the setting device 26. When operation of the electric discharge machine begins, this rotational speed or angle division position is read into the numerical controller 4, and output from the numerical controller 4 to the motor driver 16.

When performing high speed rotation control of the main spindle, a speed command signal, along with the switchover signal which switches the motor driver 16 to high speed rotational control, is output to the servo motor 15 motor driver 16 from the numerical controller 4. This high speed rotational control basically causes the main spindle to be rotated at a fixed speed in a fixed direction, so that a speed command signal corresponding to a desired analog voltage (e.g. 10V–0V DC) is generated. Speed control command based on a rotational speed, which is preset in the setting device 26 after the switchover signal, is output to the deviation counter 31. The deviation counter 31, into which the switchover signal is first input does not accept input of the feedback signal from the rotary encoder 14, and does not output a deviation signal. Similarly, nothing is done at the position gain control element KP. Finally, the speed command signal is handed over to the subtracting circuit 32. At the subtracting circuit 32, the switchover signal is received and the speed deviation between the speed command signal and the speed feedback signal from the rotary encoder 14 is output, then amplified in the next speed gain control element KV to perform speed control.

Speed control is preferably performed in the following manner. The characteristic of this control is that the pulse count of the pulse signal which is fed back from the rotary encoder 14 to the subtracting circuit 32 is reduced by sampling along its path. This reduced feedback signal is fed back to the subtracting circuit 32, and the servo motor 15 is speed controlled by calculating the speed deviation between it and the speed command signal. This reduction operation is easily accomplished by interposing an interface which uses only the pulse signal from a particular detection phase of the rotary encoder as the speed feedback signal, or by interposing an interface which reduces the feedback signal pulse count by a fixed proportion.

This allows a reduction in driver errors and overloads due to excessively large feedback pulse counts.

By speed controlling the main spindle in this manner, the main spindle is sufficiently rotationally controlled in the high speed mode using a single servo motor and a single encoder, without passing through a speed reducer.

At the same time, when performing angle division control on the main spindle, a pulse string up to the point at which the desired angle position indicated by the NC data is reached is continuously output from the numerical controller 4 at an interval based on a rotational speed which is preset in the setting device 26. This is for the case when the angle position command signal is in a digital format, but control is essentially performed in the same way even with a data command format. During this angle division control, as described above, no switchover signal to high speed rotation is input to the deviation counter 31 and therefore the deviation counter 31 receives the position feedback signal from the rotary encoder 14 and outputs a position deviation signal. After being amplified by a specified position gain KP at the position gain control element KP, this position deviation signal is further added to or subtracted from in the subtracting circuit 32 by the speed feedback signal from the rotary encoder 14. That deviation is then amplified as the speed deviation by means of the speed gain KV in the speed gain control element KV, and is output to the servo motor 15 as the speed control signal. This speed feedback control is of course the previously mentioned minor loop control. The main spindle is thus positioned to a desired angular position. When electric discharge machining commences, the brake device 23 is normally automatically activated, and the main spindle is held such that it does not drift from that position. When constantly servoing in the C axis direction, as with screw machining, there is no need to activate the brake device.

By performing angle division control of the main spindle in this manner, the main spindle device of the present invention is able to accurately perform precision angle division control of the main spindle without passing through a speed reducer, using a single motor and a single encoder. As there is no need to provide a speed reducer on the main spindle device, the main spindle device can be relatively simple in structure, and the machining head can be made compact and light weight, while the control system can be made simpler and less expensive.

The above-described present invention may be implemented in various forms without departing from the spirit or requisite features thereof. Therefore the preferable embodiments described in the present specification are exemplary and should not be interpreted as limiting.

What is claimed is:

1. A main spindle device for an electric discharge machine having a machining head which is moveable in a Z-axis direction said device comprising a main spindle adapted to be mounted on the machining head whereby the spindle device will be movable in and out of a workpiece in a machining depth direction; a high rotary inertia, high output servo motor for rotating the main spindle without decelerating;
   a high resolution angle position detector for detecting the rotational speed and the angle position of either of the servo motor or the main spindle;
   a numerical controller for outputting a switchover signal operable to switch the main spindle between a high speed rotation mode and an angle division mode, while outputting a speed command signal indicative of a desired rotational speed when rotating the main spindle in the high speed mode, or a desired angle position command signal when rotating the main spindle in the angle dividing mode;
   a motor driver which, during rotation of the main spindle in the high speed mode, performs closed loop control of the main spindle rotational speed by means of the speed command signal and the feedback signal from the angle position detector, and in angle division mode, performs closed loop control of the main spindle angle position by means of at least the angle position command signal and the feedback signal from the angle position detector.

2. The main spindle device according to claim 1 wherein the motor driver comprises a deviation output means which, when rotating the main spindle in the angle dividing mode, feeds back the signal from the angle position detector to the angle position command signal and outputs the deviation thereof and, when rotating the main spindle in the high speed mode, feeds back the signal from the angle position detector to the rotational speed command signal;
   a position gain control element which controls at a desired position gain and outputs the output from the deviation output means only when rotating the main spindle in the angle dividing mode;
   a subtracting circuit which, when rotating the main spindle in the angle dividing mode, feeds back a signal from the angle position detector to the output from the position gain control element and controls the deviation thereof and, when rotating the main spindle in the high speed mode, feeds back the signal from the angle position detector to the rotational speed command signal and controls the deviation thereof and;
   a speed gain control element which, when the main spindle is rotating in either the angle dividing or the high speed rotating mode, controls the respective desired speed gains and outputs the outputs from the subtracting circuit.

3. A main spindle device for an electric discharge machine having a machining, head moveable in a Z-axis direction, said device comprising a main spindle adapted to be mounted on said machining head movable in and out of the workpiece in the machining depth direction;
   a high rotary inertia, high output servo motor for rotating the main spindle without decelerating;
   a high resolution angle position detector associated either with the servo motor or the main spindle, for detecting the rotational speed and the angle position of either of the servo motor or the main spindle;
   a numerical controller which outputs a switchover signal for switching between a high speed rotation mode and an angle division mode, while outputting a speed command signal indicative of a desired rotational speed when rotating the main spindle in the high speed mode, and a desired angle position command signal when rotating the main spindle in the angle dividing mode;

a motor driver which, when rotating the main spindle in the high speed mode, performs closed loop control speed control of the servo motor by means of the speed command signal and a feedback signal from the angle position detector from which a specified proportion of the pulse count thereof has been subtracted, and, when rotating the main spindle in the angle dividing mode, performs closed loop control of the main spindle angle position by means of at least the angle position command signal and a feedback signal from the angle position detector.

4. The spindle device according to claim 3 wherein the motor driver comprises a deviation output means which, when rotating the main spindle in the angle dividing mode, feeds back the signal from the angle position detector to the angle position command signal and outputs the deviation thereof and, when rotating the main spindle in the high speed mode, feeds back the signal from the angle position detector to the rotational speed command signal;

a position gain control element which controls at a desired position gain and outputs the output from the deviation output means only when rotating the main spindle in the angle dividing mode;

a subtracting circuit which, when rotating the main spindle in the angle dividing mode, feeds back a signal from the angle position detector to the output from the position gain control element and controls the deviation thereof and, when rotating the main spindle in the high speed mode, feeds back the signal from the angle position detector to the rotational speed command signal and controls the deviation thereof and;

a speed gain control element which, when the main spindle is rotating in either the angle dividing or the high speed rotating mode, controls the respective desired speed gains and outputs the outputs from the subtracting circuit.

* * * * *